United States Patent [19]

Seidel

[11] 4,240,397
[45] Dec. 23, 1980

[54] FUEL SAVER OVEN

[75] Inventor: Harry W. Seidel, Mertztown, Pa.

[73] Assignee: Raytheon Company, Lexington, Mass.

[21] Appl. No.: 6,135

[22] Filed: Jan. 24, 1979

[51] Int. Cl.³ .......................... A21B 1/00; F24C 15/32
[52] U.S. Cl. ............................... 126/21 R; 126/285 B; 236/1 G; 431/20
[58] Field of Search ............... 126/21 R, 21 A, 285 B; 236/1 G; 431/20

[56]       References Cited
        U.S. PATENT DOCUMENTS 3,624,742  11/1971  Hurko ............................. 126/121 R
4,079,884   3/1978  Sherman ........................... 236/1 G Primary Examiner—George T. Hall
Attorney, Agent, or Firm—William R. Clark; Milton D. Bartlett; Joseph D. Pannone

[57] ABSTRACT

A gas-fueled oven having energy saving capabilities provided by a thermostatically controlled gas supply valve which supplies fuel to the gas burner at cycled intervals, and a flue restricter which is operatively connected with the thermostat to move into closing relation to the oven exhaust flue when the burner is cycled off, thereby retaining within the oven cavity an amount of heat which would normally be allowed to escape through the flue if the flue restricter was not utilized.

10 Claims, 5 Drawing Figures

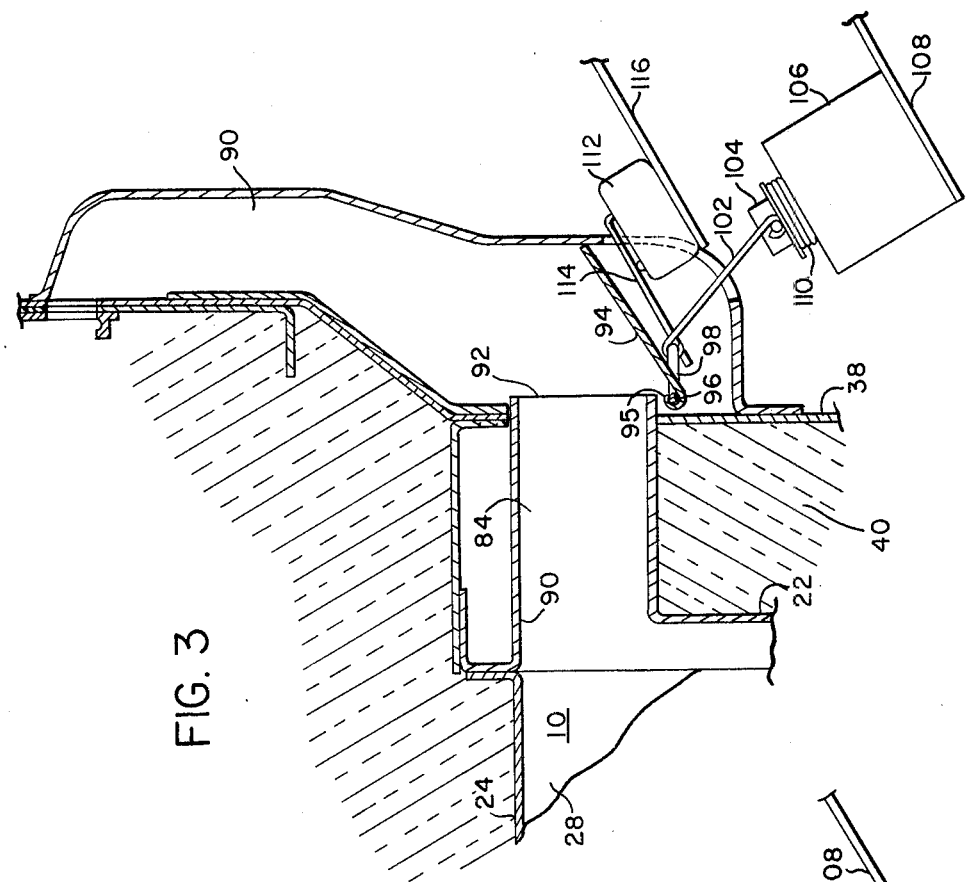
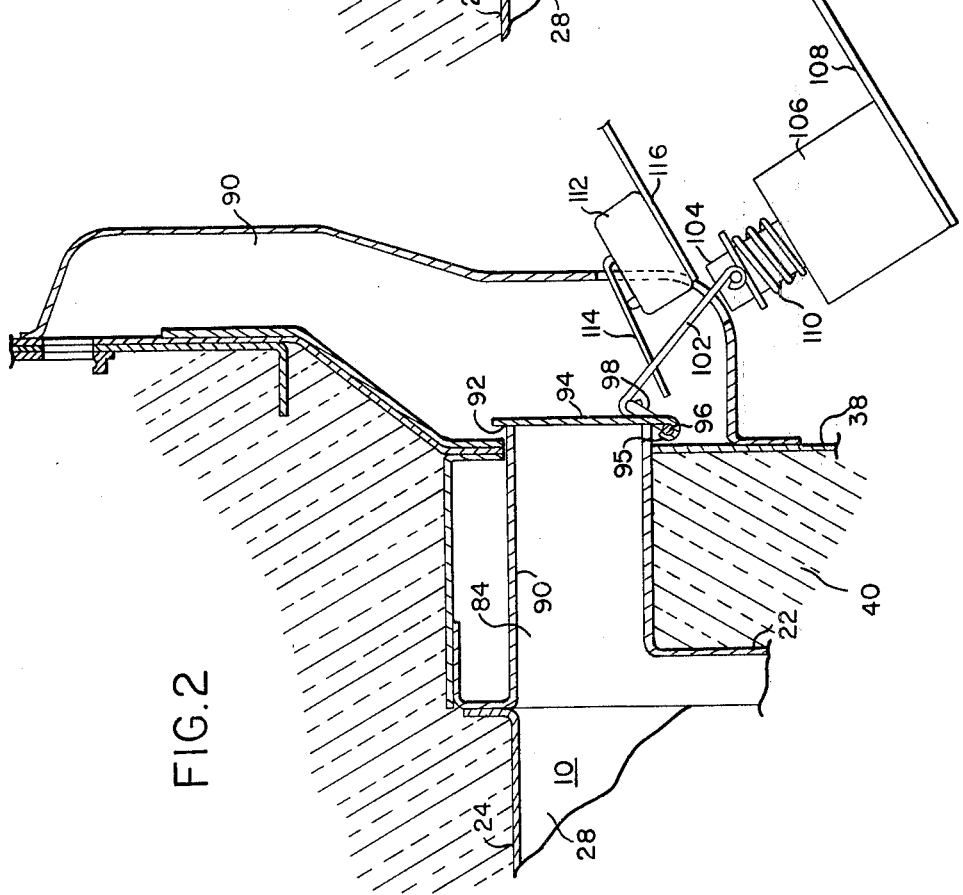

FUEL SAVER OVEN

BACKGROUND OF THE INVENTION

In conventional gas ovens there is provided at least one gas-fueled burner which is utilized to supply heat upon demand to the oven cavity for either broiling or baking purposes. When food to be heated is placed in the oven, the operator will manually open a gas valve to allow fuel to flow to the burner where it will be ignited by an electric igniter. This will cause the burner to raise the temperature within the oven to a preset maximum level.

During a cooking cycle combustion products will be generated and will pass out of the oven through a flue and will be exhausted to the atmosphere external to the oven. When the preset maximum temperature level has been reached a thermostat will cause the gas valve to close, shutting off the supply of fuel to the burner. Consequently, the oven temperature will drop to a preset mimimum level at which the thermostat will again operate the valve, opening it to again supply fuel to the burner for raising the oven temperature. Such cycling of the burner is conventional procedure whereby an oven will be maintained at a relatively constant temperature between the preset maximum and minimum levels during the cooking process.

When the maximum preset temperature level has been reached and the burner turned off, the combustion products and air within the oven will continue to be exhausted through the flue. It will be apparent that such loss of hot air will cause the temperature of the oven to be lowered relatively quickly. Thus, the burner consequently will be reoperated much sooner than is desirable. This creates undesirable fuel consumption.

SUMMARY OF THE INVENTION

The present invention overcomes the foregoing and other objections to prior art gas ovens by the provision of means for closing the flue simultaneous with the closing of the gas valve to turn off the burner at the preset maximum temperature level. With the flue thus closed, heated air will not escape through the flue and, therefore, heat will be retained within the oven for a longer period of time than in conventional ovens. This will consequently save fuel since the intervals during which the burner is off are relatively lengthy.

When the oven is eventually cooled to the preset mimimum temperature level, the thermostat will call for heat and will open the gas valve so that fuel will again be supplied to the burner. Simultaneously therewith the flue will again be opened to allow combustion products and gases to be exhausted from the oven.

The means for closing the flue, in accordance with this invention, comprises a platelike restrictor which is hinged for pivotal movement into and out of closing relation to the aperture at the oven end of the flue. The restricter is operatively attached to the movable plunger of a solenoid which is electrically connected to the thermostat. The restricter mechanism is also operatively connected to the gas valve so that when the thermostat calls for heat, the solenoid will be activated to operate mechanism which will move the restricter in a manner to open the flue, and such movement of the restricter-operating mechanism will operate to open the gas valve, allowing fuel to flow to the burner which will become ignited and will supply heat to the oven.

The opening of the flue will slightly precede the opening of the valve, and the valve will not be opened unless the flue is open. Thus, fail safe operation is achieved.

When the oven has become heated to the preset maximum temperature level, the thermostat will cause deenergization of the solenoid, causing the restricter to move so as to close the flue and simultaneously operate to close the gas valve. The closing of the valve will shut off the flow of fuel to the burner, extinguishing it, and will precede slightly the closing of the flue.

BRIEF DESCRIPTION OF THE DRAWINGS

The above and other objectives and advantages of this invention will become apparent from the following description taken in connection with the accompanying drawings, wherein:

FIG. 2 is an enlarged sectional view of the flue-closing mechanism showing the flue closed;

FIG. 3 is a view similar to FIG. 2 showing the flue open;

DESCRIPTION OF THE PREFERRED EMBODIMENT

Figure 1:
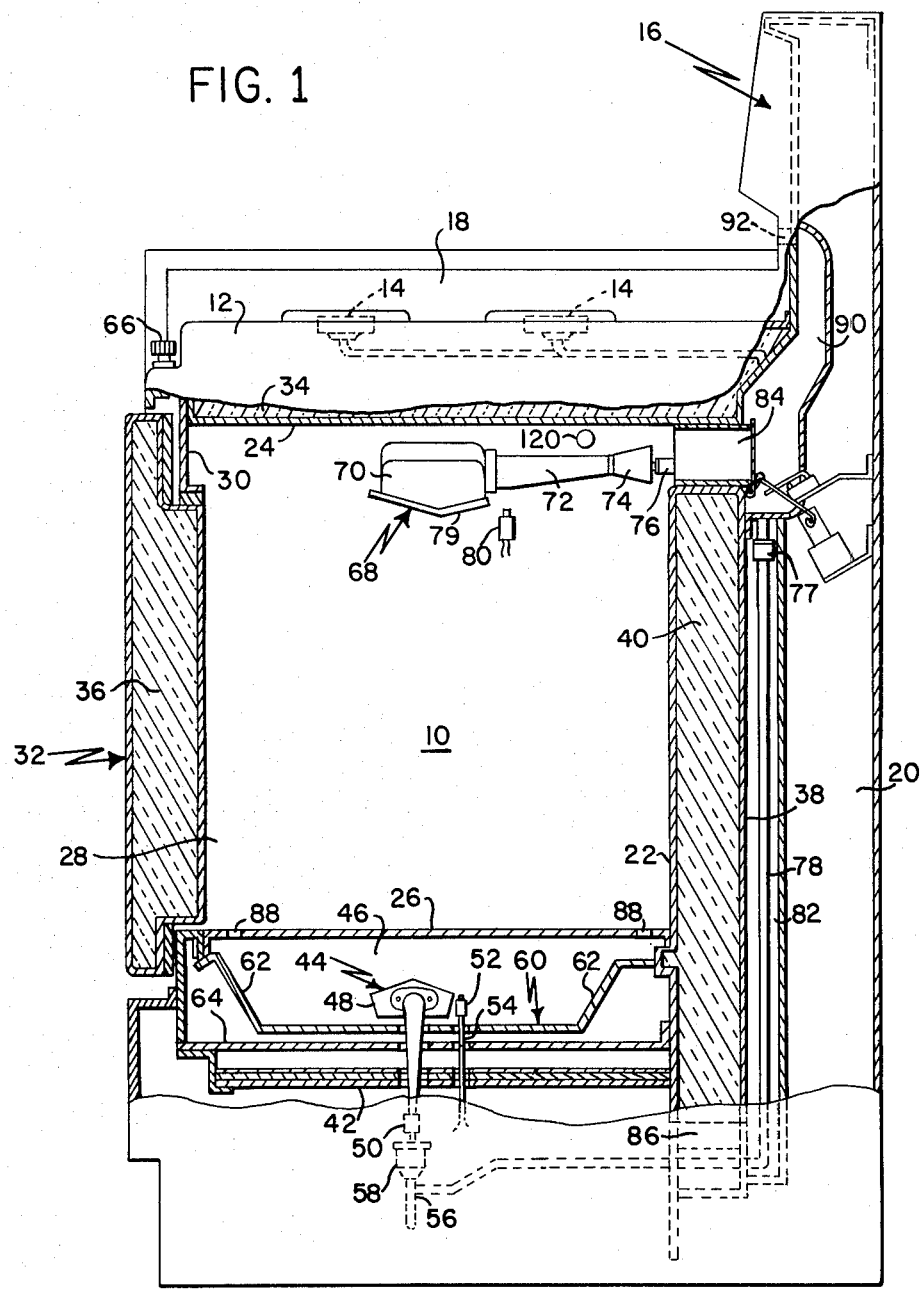
FIG. 1 is a side elevational view partly in vertical section of a gas range having a gas-fueled oven embodying the invention.

Referring more particularly to the drawings wherein like characters of reference designate like parts throughout the several views, the range depicted in FIG. 1 is a type known as a "free-standing" range having an oven 10 and, above the oven, a cooktop 12 with two burners 14 thereof being shown. There is an upstanding backsplash 16 and sidesplashes 18 arranged respectively at the back and sides of the cooktop 12, and a vertical passage 20 extends along the back of the range to provide a passageway for cool air between the oven and an adjacent wall (not shown).

It is to be understood that the invention may be utilized, however, with other types of gas ovens such as a "built-in" wall oven, for example.

The oven 10 is defined by a substantially box-shaped metal liner which delineates the oven cavity and comprises a rear wall 22, a top wall 24, a bottom wall 26, and a pair of side walls 28. An opening is provided in the front of the range and through the liner front wall 30 whereby the interior of the oven cavity is accessible from the front of the range. A door 32 is mounted upon the front of the oven by a suitable hinge structure (not shown) whereby the door is pivotally movable into open or closed relation with respect to the open front of the oven.

The hinge and latching structures are not shown and do not constitute in themselves part of the present invention.

The oven liner top wall 24 is spaced well below the cooking top 12 and heat-insulated therefrom by a bolt 34 of fibrous glass or other selected insulating material which is intended to aid in confining heat as much as possible to the interior of the oven during its operation. The door 32 may be similarly filled with insulating material 36, and at the back of the range an insulating panel or shield 38 is provided in spaced relation with the oven rear wall 22, and the space therebetween is also filled with insulation 40. The sides of the oven are similarly insulated from the outer side wall (not shown) of the range. At the bottom of the range is a heat-reflecting shield or plate 42, provided for reflecting heat upwardly back toward the oven 10 and thus serving to protect the floor beneath the range.

The disclosed oven 10 is provided with two burners to be described, but in certain cases only a single burner may be employed. A lower burner 44 is located beneath the bottom wall 26 and above shield 42. Burner 44 extends a substantial distance across the cavity 46 in which it resides and is of a conventional blue-flame type which includes a ported burner head 48 having a chamber for receiving gaseous fuel from a venturi 50 or the like. An electric igniter 52 of conventional type is located adjacent the burner head 48 so that jets of flame will be ignited at each of the ports in the head when the control system (not shown) is operated to allow gas to flow the head from a supply line 56 via valve 58.

The lower burner 44 is enclosed within the cavity 46 on the bottom and sides by a heat-reflecting shield 60, the bottom of which is mounted above and spaced from shield 42 and which has side portions or wings 62 angled upwardly and outwardly to deflect heat toward the bottom wall 26 of the oven. Suitable apertures are provided in the shields 42 and 60, as well as through an additional intermediate heat reflector 64, for insuring that sufficient air enters the cavity to sustain combustion. Such venting is conveniently done by enlarging the openings in these members through which the pipes to the burner and pilot extend.

The burner head 48 is provided with longitudinally spaced ports so that upon operation a number of jets of blue flame will project outwardly from the respective ports in the normal manner of a burner of this type. The control system may include one of a group of switches controlled by knobs 66 which is suitably connected to the valve means 58 for controlling the flow of gas to the lower ported burner 44.

The radiant burner 68 is in the oven cavity at the upper extremity thereof and is of a type which produces a broad sheet of flame or incandescence. One example of a radiant burner of a type suitable for use in the self-clean oven of the present invention is that disclosed in U.S. Pat. No. 3,122,197. This burner comprises a device wherein gas is burned on the surface of a screen to heat the screen to incandescence. Such a radiant burner 68 includes a burner head 70 defining an open-sided cavity, and a mixing chamber such as a venturi 72 which has its inner end communicating with the burner cavity and the outer end 74 adapted to receive gas from a pipe 76 which extends through the rear wall 22 and shield 38 and is connected by a valve 77 to a pipe 78 which extends downwardly behind rear shield 38. The mixing chamber 72, for efficient and rapid combustion, is required to receive an ample supply of primary combustion air. For example 10 parts of air to one part of gas is considered to be one satisfactory ratio in the case of natural gas. To insure an adequate supply of uncontaminated primary combustion air, the mixing chamber 72 is made in the nature of an oversized venturi as shown.

The burner 68 also includes as assembly 79 of a number of screens, as described in the aforementioned U.S. patent, which screens close the open side of the burner cavity, this being the lower surface or side when the burner 68 is positioned in the upper extremity of the oven cavity as shown. It will be apparent that a radiant burner 68 may be made which will produce an extremely broad, substantially continuous flame or incandescence which covers a substantially large radiating area.

The valve 77 is also connected into the control system so that, when the control system is operated to allow gas to flow from pipe 76 into the mixing chamber 72, where it becomes mixed with air, and then into burner head 70, it will become ignited by an electric igniter 80. This creates a broad burner flame which radiates infrared energy throughout the oven cavity.

It will be noted that primary air is provided for the radiant burner head 70 by means of a duct 82 which extends upwardly along rear wall 38 and terminates at its upper end at an opening (not shown) at the rear of the oven through which the pipe 76 extends. The end of the mixing chamber 72 actually is positioned so as to be substantially unaffected by combustion products rising from the lower burner. Since the lower end of the duct 82 terminates in the lower regions of the range, a constant supply of uncontaminated air is allowed to pass into the burner head 70. The lower end of duct 82 is shown as terminating at an opening 86 which communicates with the region of the range beneath the lower heat shield 42.

It will be understood, as pointed out before, that the burners 44 and 68 may be operated individually and separately from one another for conventional baking and broiling operations. Both burners may be operated simultaneously for at least a portion of the time when performing a self-cleaning operation, although the upper burner must be operated for a short time before the lower burner at the start of a self-cleaning operation, and one or both burners may be intermittently operated or modulated during a self-cleaning cycle in order to maintain a required temperature level. The gas supply line 56 is adapted to be connected to any suitable source of gaseous fuel.

In an oven of this character it will be understood that little or no movement of air will occur within the oven when the door 32 is closed and when the oven is cold. However, upon ignition of one or both burners, the air within the oven will become heated and will tend to rise, creating what is known as a stack action. For this purpose, the oven bottom wall 26 is provided with at least one opening 88 (FIG. 1) whereby fresh air may be allowed to flow from the cavity 46 upwardly into the oven 10 as heated air is exhausted. The heated air passes out through an upper opening or exhaust vent 84, from which it flows into a vertical flue 90 behind the cooking top and thence upwardly into the backsplash 16, eventually being exhausted into the ambient atmosphere through openings 92 in the front of the backsplash.

During the normal operation of the oven for either baking or broiling it is intended that the oven be brought up to a selected maximum temperature level and maintained at approximately that level for a predetermined time period. In conventional gas ovens the temperature level is usually maintained by switching the burner off and on during the cooking cycle by thermostatic control of the valve which operates to supply fuel to the burner from a supply pipe connected to a fuel source.

It has been found that after an oven has been heated to the selected maximum temperature level, the thermostat will cause the valve to close, shutting off the supply of fuel to the burner, causing the burner flame to be extinguished. At this point the oven will start to cool. When the oven temperature has been lowered a predetermined amount, usually only a few degrees, the thermostat will again call for heat by opening the valve to allow fuel again to be supplied to the burner which will reignite and again supply heat to the oven. Such cycling continues until the end of the cooking interval.

It has been found that when the burner is off, a substantial amount of heat escapes through the exhaust flue 90 via opening 84. Thus the cooling cycle is shortened, causing the burner to be reignited sooner than desirable. During a complete cooking cycle, such repeated early reignitions of the burner will consume substantial amounts of fuel.

In accordance with this invention there is provided means for closing the flue opening substantially simultaneous with the extinguishing of the burner flame. In this way heat is prevented from escaping from the oven, thereby lengthening the time intervals between burner operations and thus conserving fuel. Such means is completely automatic and will also function to open the flueway when the burner is reignited at the termination of the off cycle.

Figure 4:
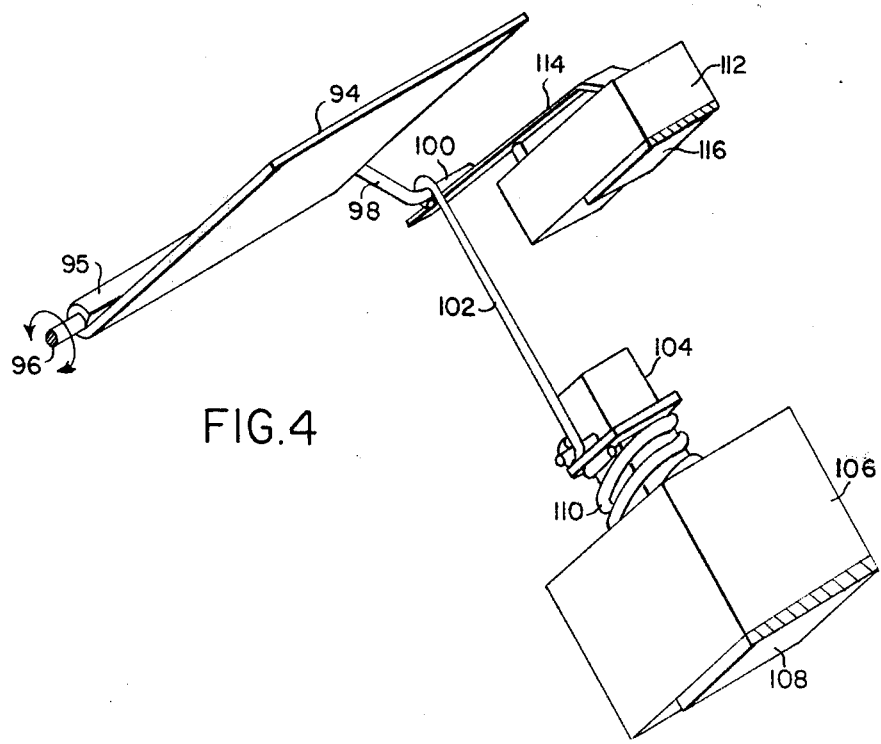
FIG. 4 is an isometric view of the flue-closing mechanism.

The mechanism for accomplishing the invention is clearly illustrated in FIGS. 2-4 and may be used in conjunction with either the bake burner 44 or the broil burner 68. In the present description the invention is disclosed as being utilized with the broil burner 68 and its associated gas valve 77, but it is to be understood that the invention may be similarly utilized with the bake burner 44 and its associated valve 58. The exhaust opening or vent 84 near the top of the oven and leading to the exhaust flue 90 will be opened and closed by the mechanism of the invention regardless of which burner is being utilized.

In another concept or embodiment of this invention, both burners may be simultaneously utilized with this invention, it being only necessary to insure that the flue is open when either one of the burners is on and closed only when both burners are off.

The exhaust vent 84 is preferably an annular or tubular member 90 which extends through the wall of the oven preferably near the top of the oven back wall comprising the wall 22, insulation 40 and panel 38. The inner end of the member 90 is open to the interior of the oven while its outer end 92 opens into the exhaust flue 90.

A plate-like restricter or flapper 94 is pivotally mounted for movement into and out of closing relation with the end 92 of member 90 by means of a pintle 96 which has its opposite ends rotatably mounted in respective side walls of the flue 90. The lower end of the restricter is preferably provided with a flange 95 which is rolled around and fixed tightly upon the pintle 96 so that the restricter may be swung about the axis of the pintle into and out of closing relation to the end 92 of member 90.

Figure 5:
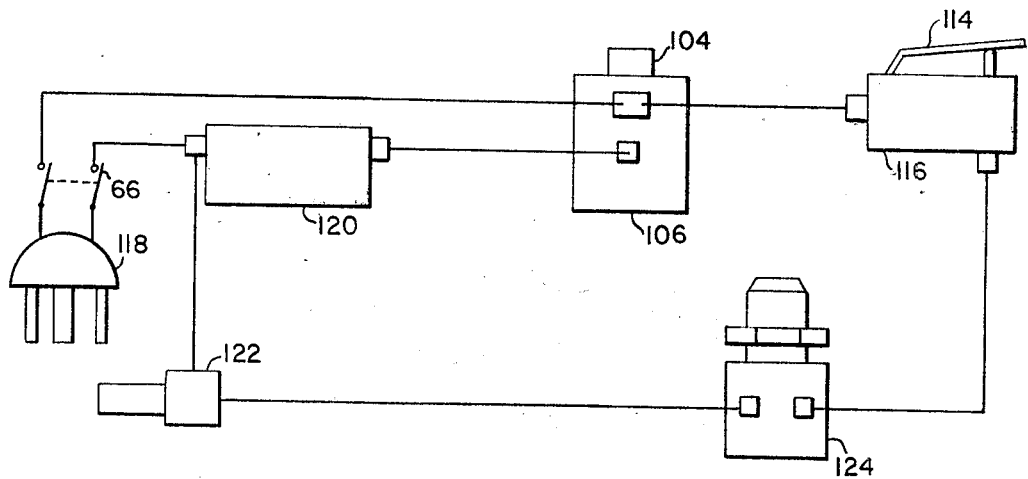
FIG. 5 is a diagram of the electrical circuit utilized in the invention.

The pintle is provided with an angularly extending cam portion 98 on which is formed a right-angled extension 100 (FIG. 4) to which is secured one end of a rod 102. The other end of rod 102 is secured to the plunger 104 of a solenoid 106 which is conveniently mounted as by bracket 108 on a fixed portion of the oven. The solenoid 106 is electrically connected into an electric circuit as shown in FIG. 5 (to be described hereinafter) so that when the solenoid 108 is energized it will retract plunger 104, pulling rod 102 and causing pivotal movement of the pintle 96. This will move the restricter 94 away from the end 92 of member 90, opening the flue 90 as depicted in FIG. 3.

When the solenoid 106 is deenergized, spring 110 will urge the plunger 104 outwardly, consequently moving the rod 102 and pintle 96 so as to close the restricter 94 upon the end 92 of member 90, thus closing the flue.

A switch 112 is provided with an actuator 114 which is located conveniently in a position to be engaged by a portion of the pintle extension 100 when the solenoid is energized to open the flue 90. The switch 112 is suitably mounted as by bracket 116 on a fixed portion of the oven and will preferably be a normally open switch. The switch 116 and the solenoid 106 are connected as by a plug 118 to a suitable source of electrical energy as shown in FIG. 5. A thermostat 120, is electrically connected between the plug 118 and solenoid 106 as shown and is conveniently mounted in the oven 10 to detect the temperature therein.

The solenoid 106 and switch 116 are preferably connected in series to one side of the electrical circuit, and an electric igniter 122 and gas valve 124 are series connected in the other side of the circuit, with the valve 124 being connected to the switch 116. The thermostat 120 is also connected between the source 118 and solenoid 106 as shown.

In the normal inoperation condition of the oven, the thermostat 120 will not call for heat. Therefore, the solenoid 106 will be deenergized, closing the flue 90 as described hereinbefore. The switch actuator 114 will not be depressed and, therefore, the switch is open.

When it is desired to operate the oven, a manually operable switch 66 is closed, turning on electrical power to the oven. At this point the thermostat 120 will call for heat by closing the circuit to the solenoid 106. Closing of solenoid 106, through plunger 104, rod 102, cam member 98 and pintle 96, will move the restricter 94 to open the vent 84. When the exhaust vent 84 is open, the extension 100 will be positioned so as to depress the actuator 114, closing switch 112. This will cause the electrical igniter 122 to be activated and will cause the gas valve 124 to open, resulting in the turning on of the burner.

When the burner has heated the oven to the selected maximum temperature level, the thermostat 120 will deenergize the solenoid 106. At this point the plunger 104 will project, and through rod 102, will cause extension 100 to release actuator 114, opening the switch 112. This will deenergize the igniter 122 and cause valve 124 to automatically close, extinguishing the burner. Such movement of the rod 102, through cam member 98 and pintle 96, will move the restricter 94 to close the vent 84. In this way hot air will not be allowed to escape freely through the flue.

When the temperature within the oven eventually is lowered to the selected minimum temperature level, the thermostat will again call for heat, reactivating the solenoid, switch, valve and igniter as previously described, and again turning the burner on. Such cycling will continue for the desired cooking time period.

It will be apparent from the foregoing that during a cooking process, since hot air will be retained within the oven for lengthy periods of time during burner off cycles instead of escaping out the flue, there is no need for the burner to be cycled on as often as is the case with conventional ovens. Thus a substantial saving in fuel is achieved.

It will also be apparent that various modifications and changes in the structures shown and described may be made by those skilled in the art without departing from the spirit of the invention as expressed in the accompanying claims. Therefore, all matter shown and described is to be considered as illustrative and not in a limiting sense.

What is claimed is:

1. A gas-fueled oven comprising a plurality of walls defining an oven cavity, at least one burner in the oven cavity, means for exhausting air from said oven cavity including an exhaust vent in one of said walls, means for supplying fuel to said burner, means for thermostatically cycling the burner on and off, means for closing said vent when the burner is off, and said closing means being controlled by said cycling means.

2. A gas-fueled oven as set forth in claim 1 wherein said fuel supplying means includes piping connecting said burner to a supply of gas, said cycling means includes a valve in said piping operable to control flow of gas to the burner, and said vent closing means is connected to said valve for operation concurrently with operation of the valve.

3. A gas-fueled oven as set forth in claim 2 wherein said valve is operable to permit and interrupt the flow of gas to the burner and consequently to permit operation of or to extinguish said burner, and said vent closing means includes a closure member movable into closing relation to said exhaust vent when the valve is operated to extinguish the burner and movable out of closing relation to the exhaust vent when the valve is operated to permit flow of gas to and consequent operation of the burner.

4. A gas-fueled oven comprising a plurality of walls defining an oven cavity, at least one burner in the oven cavity for heating the interior thereof, piping for supplying fuel to said burner, operating means for cycling the burner off and on during a cooking process, a vent in one of said walls for exhaust of combustion products during a cooking process, exhaust control means for preventing escape of hot air through the vent when the burner is cycled off, and said exhaust control means being controlled by said cycling means.

5. A gas-fueled oven as set forth in claim 4 wherein said exhaust control means comprises a restricter movable into and out of closing relation with said vent concurrently with cycling of said burner by said operating means.

6. A gas-fueled oven as set forth in claim 4 wherein said operating means includes a thermostat in said oven cavity, a valve in said piping operable when open to permit flow of fuel to the burner and when closed to interrupt flow of fuel to the burner, said valve being operatively connected with said thermostat, and said exhaust control means includes a restricter movable into and out of closing relation with said vent, and restricter operating mechanism operatively connected with said thermostat for operation concurrently with operation of the valve under control of the thermostat.

7. A gas-fueled oven as set forth in claim 6 wherein said thermostat is operable when the temperature in the oven cavity is below a selected maximum level to initiate operation of the restricter operating mechanism to move the restricter into open relation to said vent and to initiate opening of the valve concurrently therewith whereby combustion products resulting from operation of the burner are allowed to escape through the vent, the thermostat further being operable when the temperature in the oven cavity has reached said selected maximum level to initiate operation of the restricter operating mechanism to move the restricter into closed relation to said vent and to initiate closing of the valve concurrently therewith whereby heated air is prevented from escaping through the vent when the burner is inoperative.

8. A gas-fueled oven comprising a plurality of walls defining an oven cavity, at least one burner in the oven cavity for heating the interior thereof, a thermostat in said cavity for detecting the temperature therein, piping connecting said burner with a source of fuel, a gas valve in said piping for controlling flow of fuel to said burner, an exhaust vent in one of said walls for escape of combustion products when the burner is operating, means for shutting off flow of fuel to the burner, means for closing said vent concurrent to shutting of said flow of fuel to prevent escape therethrough of heated air when the burner is inoperable, and said closing means being controlled by said thermostat.

9. A gas-fueled oven as set forth in claim 8 wherein said valve is electrically connected to said thermostat and opened thereby to permit flow of fuel to the burner when the temperature in the oven is below a selected maximum level and closed thereby to shut off flow of fuel to the burner when the temperature in the oven is below said maximum level, and said means comprises a solenoid electrically connected with said thermostat, a restricter adjacent said vent and operably connected with said solenoid for movement into open relation to the vent when the solenoid is energized and into closing relation to the vent when the solenoid is deenergized, said thermostat being operable to energize the solenoid concurrent with opening of the valve and to deenergize the solenoid concurrent with closing of the valve.

10. A gas-fueled oven as set forth in claim 9 wherein a normally open switch is positioned adjacent said solenoid, and is electrically connected between the thermostat and valve, said solenoid has a plunger retractable when the solenoid is energized, and spring means for moving the plunger in the opposite direction when the solenoid is deenergized, an actuator connects said restricter with said plunger, and the actuator has a portion movable into and out of operative relation to the switch in response to corresponding movement of said plunger, whereby said switch electrically controls the valve in response to movement of said plunger.

* * * * *